March 7, 1967  R. B. RANSOM  3,307,799
DRAG MECHANISM FOR FISHING REEL
Filed July 10, 1964
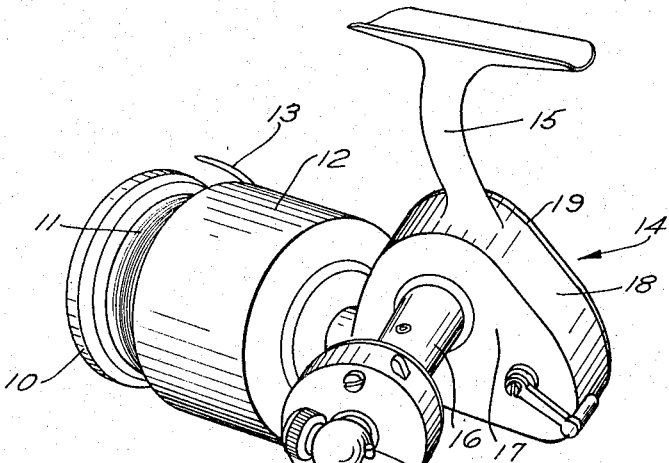
FIG. 1
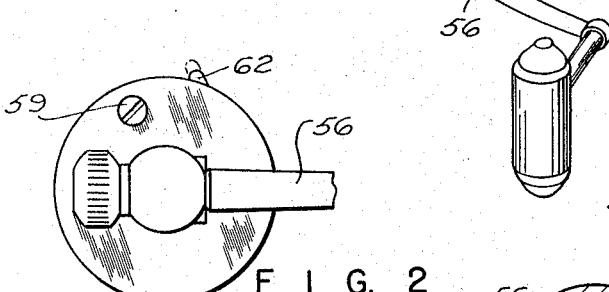
FIG. 2
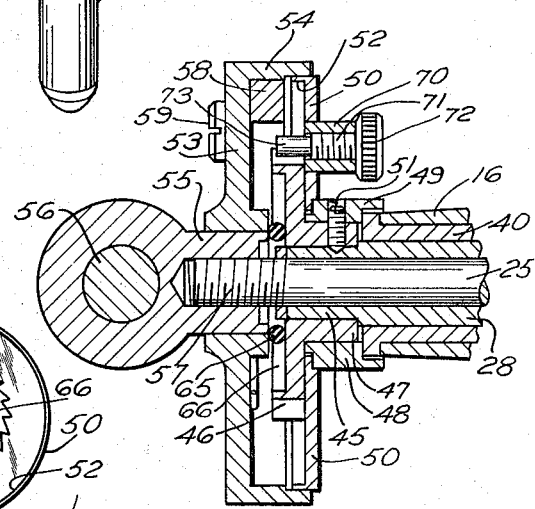
FIG. 3
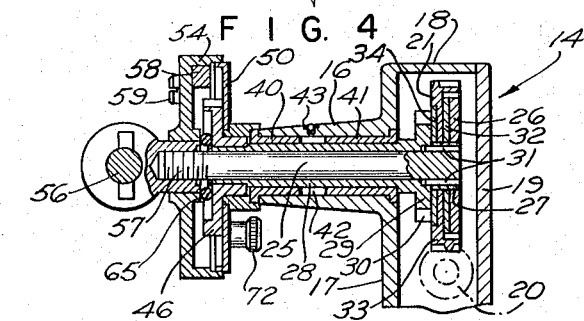
FIG. 4
FIG. 5
INVENTOR.
ROBERT B. RANSOM
BY
Barlow & Barlow
ATTORNEYS United States Patent Office 3,307,799
Patented Mar. 7, 1967

3,307,799
DRAG MECHANISM FOR FISHING REEL
Robert B. Ransom, Westerly, R.I.
(N. Williams Road, Weekapaug, R.I. 02891)
Filed July 10, 1964, Ser. No. 381,814
9 Claims. (Cl. 242—84.44)

This invention relates to a drag mechanism for a fishing reel.

Drag mechanisms for a fishing reel have been known and often are applied by means of a star wheel separate from the reel handle. However, some mechanisms apply the drag through the handle which is utilized for rotating the reel for winding the fishing line thereon. In drag mechanisms which are operated by the reel handle, the arrangement is such that there is a stop mechanism which may be engaged by some part of a handle to determine a minimum drag by rotation of the handle in one direction but when it is desired to put on more drag, the handle is rotated to a position to put on maximum drag or a position in which the fishing line will be wound on the reel by movement of the handle and there is no intermediate position for applying drag on the line between the minimum and maximum positions while reeling the line.

One of the objects of this invention is to provide a mechanism by which the fishing line may be wound on the reel through a drag which may be varied between maximum and minimum in a large number of increments.

Another object of this invention is to interpose a ratchet mechanism for adjusting the drag between maximum and minimum by which the fishing line may be wound on the reel with any one of a selected number of drag positions by operation through the reel winding handle.

With these and other objects in view, the invention consists of certain novel features of construction as will be more fully described and particularly pointed out in the appended claims.

In the accompanying drawings:

FIG. 1 is a perspective view of a fishing reel of the spinning type;

FIG. 2 is an end view of the casing housing this invention;

FIG. 3 is a sectional view on a larger scale through the casing of FIG. 2;

FIG. 4 are plan views showing the two parts of the casing of FIG. 2 laid open by one part being swung through 90° in one direction and the other part being swung through 90° in the other direction; and FIG. 5 is a sectional view through the drive mechanism of the reel.

In proceeding with this invention, I have modified the reel drag mechanism which is applied through relatively axially movable telescoping shafts by an arrangement so that various controlled opposite forces may be applied to the telescoping shafts to apply friction on the drag mechanism.

With reference to the drawings, 10 designates the relatively fixed spool upon which the fishing line 11 is wound, by means of a housing cup 12 and pick-up mechanism designated 13 which cup rotates about the spool 10 and winds the fishing line thereabout. A casing 14 having a mounting stand 15 for attachment to a fishing rod houses the cup driving mechanism with a boss 16 extending from one side of the casing through which the driving shafts extend. This boss 16 is integral with a wall 17 of the casing which is flanged as at 18 and provided with a closing cover 19 engaging the edges of the flanges.

The driving mechanism within the casing 14 comprises a helical gear 20, FIG. 5 which is driven by the helical gear 21 and which in turn is driven through a friction drag mechanism.

The gear shaft 25 has a hub 27 which has fixed thereto, by a forced fit, a disc-like head 26. The web 33 of gear 21 is freely mounted to rotate on hub 27 and is engaged on one side by the head 26. The gear sleeve or hollow shaft 28 telescopes over the shaft 25 and has a sleeve head 29 fixed to shaft 28 to engage the other side of the web 33 of the gear 21. This sleeve head is also provided with ratchet teeth 30 for a purpose not necessarily connected with this invention. Pins 31 extend from one head to the other through the hub 27 thus connecting the two heads so that they will rotate together in unison although they may move axially one with reference to the other. A drag washer 32 is interposed between the web portion 33 of the gear 21 and the shaft head 26 while a drag washer 34 is interposed between the sleeve head 29 and the web portion 33 of the gear 21. These drag washers are of non-metallic material such as brake lining material, cork or the like. By relative axial movement of the gear sleeve and the gear shaft, it will thus be apparent that more or less drag is applied to the driving gear 21.

Bushings 40 and 41 within the boss 16 provides a rotatable bearing for the gear shaft 25 and its gear sleeve 28. The bushings 40 and 41 extend from either end of the boss leaving a lubricating space 42 with access thereto through the oil hole 43. The gear sleeve is reduced as at 45 (FIG. 3) at a location outwardly beyond the end of bushing 40 and a notched wheel 46 having a hub 47 is mounted upon this gear sleeve. A collar 48 with a lip 49 extends over the boss 16 and bushing 40 and serves to rotatably mount a first housing plate 50 between it and the ratchet gear 46 in a manner so that it may be rotatably mounted with reference to the ratchet gear and the collar. This collar 48 and wheel 46 are secured to the gear sleeve 28 by a set screw 51 passing through the collar 48 and hub 47 of the gear. The collar is provided with a flange 52.

A second housing plate 53 having a flange 54 to telescope the flange 52 of the plate 50 is keyed to the hub 55 of the handle 56 which hub threadingly engages the threads 57 of the gear shaft 25. A pawl 58 is pivoted as at 59 (see also FIG. 4) on the housing plate 53 and has a latch 60 at one end which is spring pressed by spring 61 into engagement with one of the notches of teeth of the wheel 46 and may be released by pressing inwardly handle member 62 which projects through an opening in the flange 54 of the casing plate 53. An O-ring 65 sets in the recess 66 in the toothed wheel 46 in a position to be engaged by the hub or casing part 53 which is fixed thereto so that when the hub 55 is rotated in a direction to thread the hub onto the shaft 25 (counterclockwise as seen in FIG. 1), pressure will be applied through the O-ring on the toothed wheel 46 to the end of the gear sleeve 28 urging it to the right as shown in FIG. 3 while the shaft 25 is urged or pulled to the left as shown in FIG. 3 thus oppositely urging the shafts 25 and 28 and applying pressure in opposite directions on the web 33 of gear 21 through the drag washers and bringing the two heads 26 and 29 in snugger engagement with the web 33 of the gear 21 to increase the drag on the gear wheel 21. By varying the size or confinement of the resilient O-ring 65, various amounts of resilient pressure may be applied.

To operate the reel embodying the drag mechanism as shown, and assuming that the threads 57 are left hand threads, and the line is cast out, the handle 56 will be rotated in a counterclockwise direction (FIG. 1), the latch 60 of the pawl 58 will engage the teeth of the wheel 46 and will rotate the gear shaft 25 and gear sleeve 28 to drive the gear 21 provided there is enough drag or friction applied to the gear 21.

A boss 70 is provided on the casing plate 50 and a threaded pin 71 is threaded through this boss having a handle 72 and an end portion 73 which may enter any selected one of the spaces between the teeth in the wheel 46. The pawl latch 60 cannot pass this stop 73 in a direction either with the ratchet pawl pressed into engagement with the teeth or when released. I thus provide for an adjustment just a little short of one complete revolution of the handle for adjustment of the drag.

To use the reel, the hub 55 of the handle 56 is screwed in until a maximum drag which will prevent the line from breaking is applied against the web of the gear 21. The disc 50 is then rotated with the pin 71 out and clear of the ratchet wheel 46 until the pin is in a position to be screwed inwardly so as to engage the pawl and prevent or limit any greater drag being applied. From this position, the handle 56 may be backed off to apply a little less drag through a movement of a little less than one revolution of the handle 56 to a position of a minimum drag being exerted on the spool by the pawl slipping over the teeth of wheel 46 one by one. However, if such adjustment is too little and more drag is desired, the pawl handle 62 will be pressed inward releasing the pawl from the teeth for turning the hub 55 further onto threads 57 of shaft 25. After a fish is hooked, the handle 56 may be rotated counterclockwise as seen in FIG. 1 for reeling in the line. With pressure applied on the pawl release 62, the amount of drag may be increased by counterclockwise movement or the drag may be lessened by a clockwise movement with the pawl sliding over the teeth when the pawl is released, then by continued movement counterclockwise the line may be reeled in. The release of the drag by rotation of the handle clockwise as seen in FIG. 1 may be had throughout a little less than one revolution of the handle. I have found that with a wheel having 24 teeth that I may have 19 different positions of adjustment of drag inasmuch as the latch of the pawl takes up the substantially five remaining teeth of space on the toothed wheel.

I claim:
1. In a fishing reel having a drag means comprising a pair of telescoping members through which the application of relative axial motion varies the friction applied on said means, means for applying relative opposite axial forces on said members comprising threaded means on one member and a hub threadingly engaging said threaded means and a notched wheel on one of said members and spring pressed pawl on the other of said members for holding said threaded engagement in different relative positions for determining the setting of the drag means.

2. In a fishing reel as in claim 1 wherein there is a casing about said notched wheel and pawl having an opening therethrough, said pawl having a handle extending through said opening for releasing the pawl from said notched wheel.

3. In a fishing reel as in claim 1 wherein there is a stop to limit the relative rotary motion of said pawl and notched wheel.

4. In a fishing reel as in claim 3 wherein said stop is carried by a member rotatable relative to said pawl and notched wheel.

5. In a fishing reel as in claim 1 wherein there is a resilient element through which pressure is applied to said drag means.

6. In a fishing reel as in claim 5 wherein said resilient element is an O-ring.

7. In a fishing reel having drag means comprising a pair of telescoping members through which the application of relative axial motion varies the friction applied to a drag means, means for applying relative opposite axial forces on said members comprising threaded means on one member, and a handle having a hub threaded on said threaded means and mounted for movement axially of the threaded member upon rotation of said handle relative to said threaded member, force transmitting means including said other member and a resilient element positioned about said threaded member and through which force is applied to said drag means as said handle axially moves in one direction relative to said threaded member, stop means to limit the movement of said handle in opposite direction and resiliently urged means manually releasable against said resilient urging for providing a multiplicity of selective positions of adjustment to hold said handle in various positions of movement relative to said members intermediate said stop means.

8. In a fishing reel as in claim 7 wherein there is a fishing line reel and said telescoping members are rotatable to wind the fishing line on said reel.

9. In a fishing reel having drag means comprising a pair of telescoping members through which the application of relative axial motion varies the friction applied to a drag means, means for applying relative opposite axial forces on said members comprising threaded means on one member, a handle having a hub threaded on said threaded means and mounted for movement axially of the threaded member upon rotation of said handle relative to said threaded member, force transmitting means including said other member and a resilient element positioned about said threaded member and through which force is applied to said drag means as said handle axially moves in one direction relative to said threaded member, and a releasable pawl and notched wheel means to hold said handle in various positions of movement relative to said members.

References Cited by the Examiner
UNITED STATES PATENTS

| | | | |
|---|---|---|---|
| 929,867 | 8/1909 | Meisselbach et al. | 242—84.54 |
| 1,836,755 | 12/1931 | Hirsch | 242—84.44 |
| 2,553,200 | 5/1951 | Mandolf et al. | 242—84.46 |
| 2,648,506 | 9/1953 | Kirby | 242—84.45 |
| 2,977,064 | 3/1961 | Logan | 242—84.54 |
| 2,977,065 | 3/1961 | Holahan | 242—84.54 |

FRANK J. COHEN, *Primary Examiner.*

B. S. TAYLOR, *Assistant Examiner.*